United States Patent [19]

Nishioka

[11] Patent Number: 5,787,695
[45] Date of Patent: Aug. 4, 1998

[54] DRAGGED TYPE MOWER

[76] Inventor: Masanori Nishioka, 5120-1 Nishishinden Asshimae-cho, Owariasahi-shi, Aichi-ken, Japan

[21] Appl. No.: 660,233

[22] Filed: Jun. 7, 1996

[30] Foreign Application Priority Data

Jun. 7, 1995 [JP] Japan .................. 7-140285

[51] Int. Cl.$^6$ ........................ A01D 34/00
[52] U.S. Cl. ........................ 56/15.1; 56/249
[58] Field of Search ............ 56/6, 7, 10.4, 15.1, 56/15.2, 15.5, 16.9, 11.9, 249, 249.5, 255, DIG. 10, DIG. 22

[56] References Cited

U.S. PATENT DOCUMENTS

| | | | |
|---|---|---|---|
| 3,918,239 | 11/1975 | Aldred et al. | 56/249 X |
| 4,021,996 | 5/1977 | Bartlett et al. | 56/249 X |
| 4,887,418 | 12/1989 | Pelletier | 56/249 X |
| 4,956,965 | 9/1990 | Parsons, Jr. | 56/15.1 |
| 5,003,759 | 4/1991 | Brown | 56/249 |
| 5,396,754 | 3/1995 | Fraley | 56/15.5 X |
| 5,412,932 | 5/1995 | Schueler | 56/249 |

OTHER PUBLICATIONS

Abstract of Japanese Utility Model Application No. 1/125314 dated: Oct. 1989.

Primary Examiner—Michael J. Carone
Assistant Examiner—Robert Pezzuto
Attorney, Agent, or Firm—Evenson, McKeown, Edwards & Lenahan, P.L.L.C.

[57] ABSTRACT

A dragged type mower having a body joined, at a front upper end thereof, to and suspended from an end of a boom of a travelling civil engineering machine through a suspending mechanism. The body includes a substantially rectangular-parallelepipedal frame, a cutter assembly having its shaft mounted horizontally and centrally in the frame, and a drive mechanism for driving the cutter assembly. Arcuate guide skids concentric with the cutter shaft and slightly greater in radius than the cutter shaft are provided at both side end sections of the frame from its front side to the bottom end thereof, and a horizontal guide roller is provided at the rear bottom end of the body.

12 Claims, 11 Drawing Sheets

DRAGGED TYPE MOWER

BACKGROUND OF THE INVENTION

The present invention relates to a dragged type mower which is joined to and suspended from an end of a boom attached to a traveling motor-driven machine such as a backhoe, tractor, etc., so as to mechanize and efficiently perform the mowing operation in the neighborhood of the machine by moving the boom end.

A typical example of the conventional mowers of the type joined to an end of a boom of a civil engineering machine such as a backhoe is illustrated in FIG. 13. In the drawing, B denotes a boom, 1 a cutter assembly fitted in a frame 2, and 3 a drive mechanism installed in the frame 2 for driving the cutter assembly 1. The body comprising a combination of the cutter assembly 1, frame 2 and drive mechanism 3 is generally designated by the numeral 10. Numeral 40 refers to a mechanism for suspending the mower body 10 from an end of the boom B.

The conventional suspending mechanism 40 is merely designed to function for fixing and suspending the mower body 10 from an end of the boom B, so that when the boom B vibrates vertically relative to the ground surface as shown in the drawing, the mower body 10 is also forced to move vertically, resulting in mowing with a non-uniform cut grass height. Therefore, in operation of the mower, the operator must always manipulate the boom to keep the distance between the boom end and the ground surface constant to ensure a uniform cut grass height.

In case there are bumps in the ground to be mowed, a substantial portion of the mowing work is spent manipulating the boom. When mowing is tried while the power-driven machine travels or while moving the boom secured thereto, there is no option but to either accept non-uniformity of the cut grass height due to the vertical motion of the boom end with traveling of the power machine or movement of the boom, or to allocate two operators, one in charge of operation (traveling) of the machine and the other attending to adjustment of the cut grass height.

Thus, in these cases, the mechanized mowing operation could prove even less efficient than manual work. A side elevation of a conventional cutter assembly 1 is shown in FIG. 14, and its perspective view is shown in FIG. 15.

In these drawings, numeral 11 indicates a cutter shaft having a plurality of arms 12 extending radially therefrom along the length thereof, and 14 denotes hammer knife cutters each of which is pivotally joined to the free end of the corresponding arm 12.

Normally mowing is performed with the hammer knife cutters 14 stretched in the radial direction under the centrifugal force generated by the rotation of the shaft, but in case the cutter assembly hits foreign matter such as rocks, the involved cutters 14 are pivotally bent or swung back to pass by the foreign matter.

However, since in the conventional cutter assembly the pivotal hinge was provided only at one point, its mechanism could not cope with large-sized foreign substances and would often break down or stop operating on hitting such foreign substances.

SUMMARY OF THE INVENTION

It is a primary object of the present invention to provide a dragged type mower which is capable of cutting grass with a uniform mowed grass height by an efficient and labor-saving operation.

It is another object of the present invention to provide a dragged type mower which is adaptable to be mounted to a boom of a civil engineering machine.

In order to attain these objects, this invention provides, in a first embodiment thereof, a dragged type mower of which the body portion is joined, at a front upper end thereof, to and suspended from an end of a boom attached to a traveling power-driven machine so that as the pivotally joined boom end moves with travelling of the machine, the mower body is accordingly dragged to perform mowing.

In a second embodiment of the present invention, there is provided a dragged type mower of basically the same structure as described above, in which the mower body comprises a substantially rectangular-parallelepipedal frame, a cutter assembly having its shaft mounted horizontally and substantially centrally in the frame, and a drive mechanism for driving the cutter assembly. The mower further includes arcuate guide skids concentric with the cutter shaft and slightly larger in radius than the shaft at both side ends of the frame, each skid extending from the front side to the bottom end of the frame, and a horizontal guide roller at the rear end of the bottom portion of the frame, the guide roller being designed to rotate with traveling of the motor-driven machine.

In a third embodiment of the present invention, there is provided a dragged type mower as substantially described above, in which the cutter assembly has a plurality of hammer knife cutters installed radially on the cutter shaft along its length, each of the hammer knife cutters being pivotally joined so that it can flex.

In a fourth embodiment of the present invention, there is provided a dragged type mower as basically described above, wherein a plurality of arms extend radially from the cutter shaft along its length, each of the arms being pivotally joined at its free end to an end of an intermediate link, and a hammer knife cutter is pivotally joined to the other end of the intermediate link.

In a fifth embodiment of the present invention, there is provided a dragged type mower of basically the same structure as described above, wherein pin joints are provided in the suspending mechanism to allow the mower body to swing about its horizontal axis.

In a sixth embodiment of the present invention, there is provided a dragged type mower having the above-described structure, wherein pin joints are provided in the suspending mechanism to allow the mower body to swing about its horizontal axis, each pin hole being circular or elliptical and greater than the pin section so that the pin fits loosely in the pin hole in both vertical and lateral (or back-and-forth) directions.

In a seventh embodiment of the present invention, there is provided a dragged type mower as substantially described above, wherein cord-like joining means are provided in the suspending mechanism to allow the mower body to swing about the horizontal axis, the cord joints being loose in both vertical and lateral directions.

In an eighth embodiment of the present invention, there is provided a dragged type mower as set forth above, wherein a reversing fixture is provided in the suspending mechanism to allow the mower body to turn 180° about the vertical axis.

As described above, the dragged type mower which is joinable to a boom according to the present invention includes pin joints in the suspending mechanism, which joins the mower body to a boom, to allow the mower body to swing about the horizontal axis, or the pin holes are formed circularly or elliptically and greater than the pin section, or cord joints are employed in place of pin joints, to provide loose joints in both vertical and lateral directions. Furthermore, the portion of the mower body from its front side to the bottom end is designed to describe a circle concentric with the cutter assembly or an arc slightly greater than the cutter assembly so that the change in spacing between the boom end and the ground surface occurring in the travel or swiveling motion of the boom-joined civil engineering machine won't directly lead to a change in distance between the mower and the ground surface, thus allowing mowing with uniform cut grass height.

BRIEF DESCRIPTION OF THE DRAWINGS

Other objects, advantages and applications of this invention will be made apparent by the following detailed description. The description makes reference to a preferred and illustrative embodiment of the invention presented in the accompanying drawings wherein.

DETAILED DESCRIPTION OF THE PREFERRED EMBODIMENTS

First Embodiment

The present invention is described in further detail hereinbelow regarding the preferred embodiments thereof.

Figure 1:
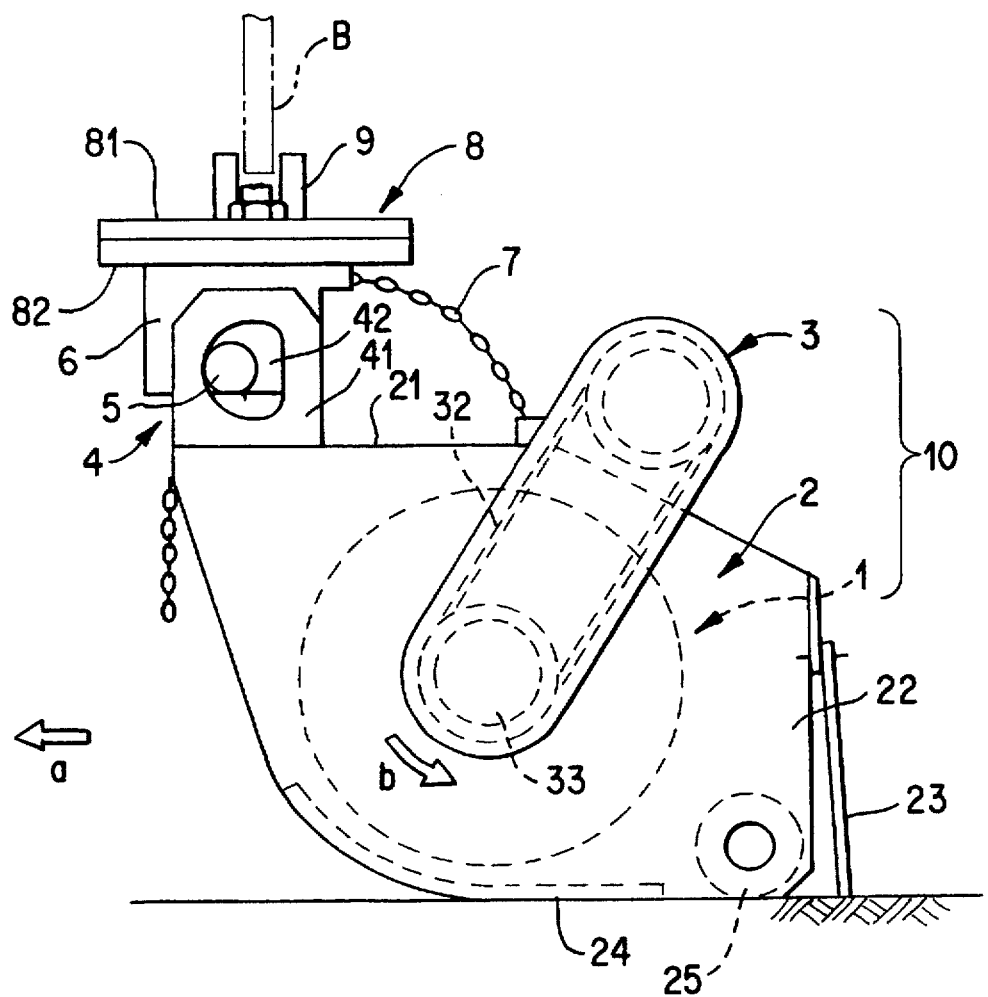
FIG. 1 is a side elevational view of a dragged type mower according to a first embodiment of the present invention.
Figure 2:
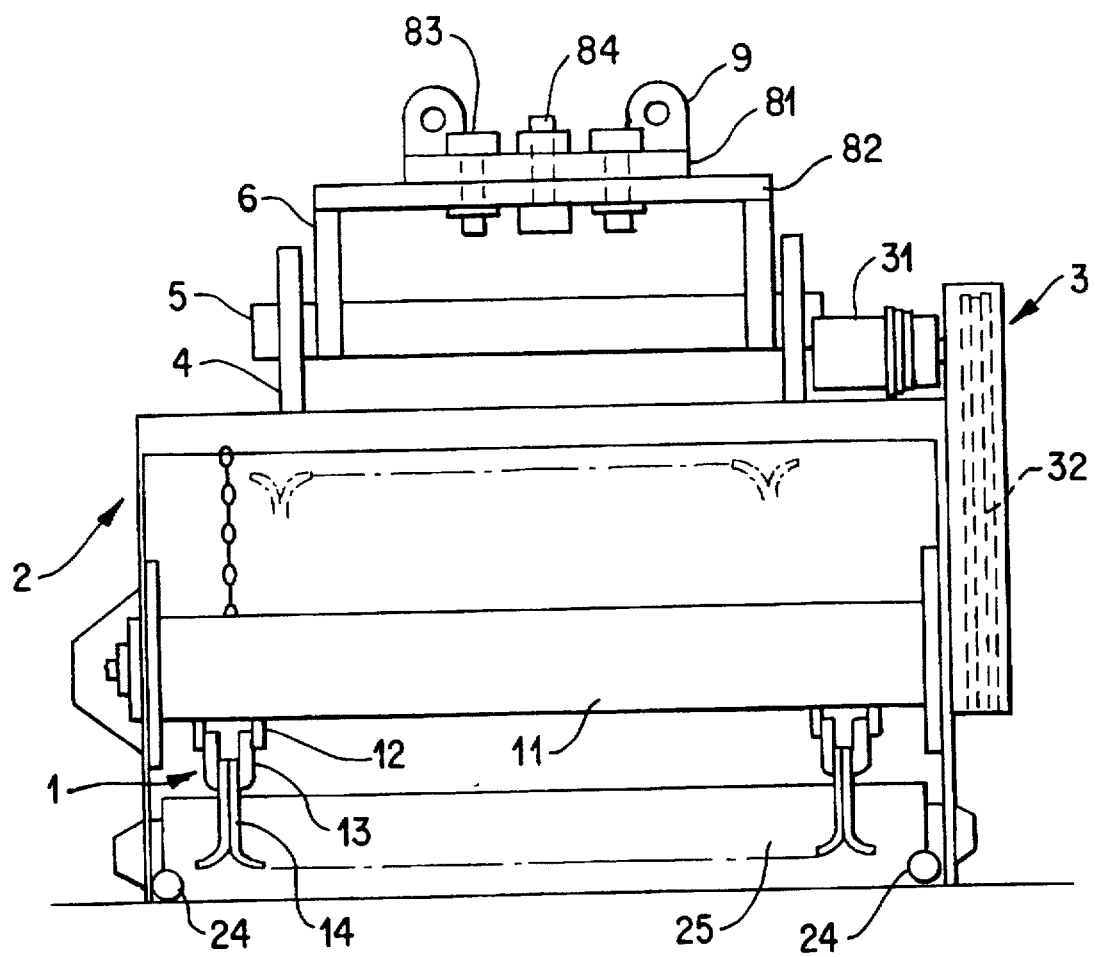
FIG. 2 is a front elevational view thereof.
Figure 3:
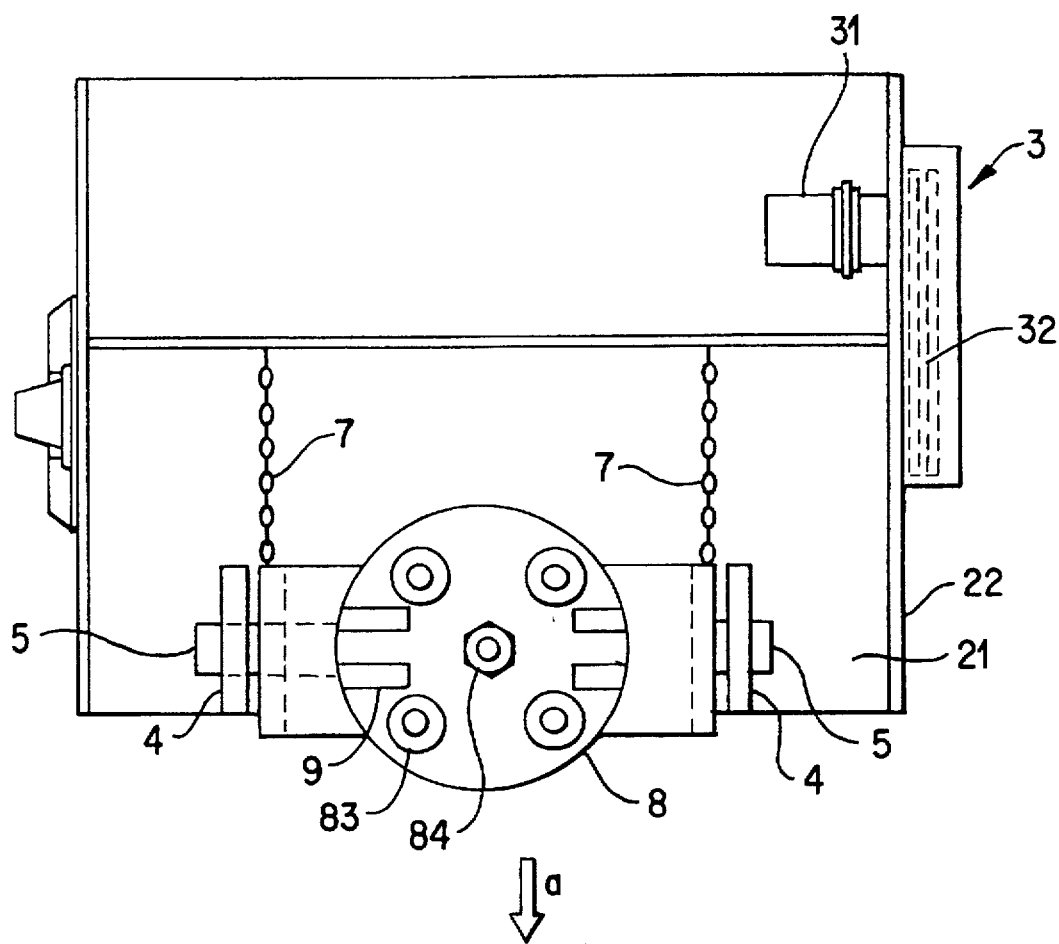
FIG. 3 is a plan thereof.

A first embodiment of the present invention is explained with reference to FIGS. 1 to 3.

In the drawings, reference numeral 1 denotes a cutter assembly for cutting grass, 2 a substantially rectangular-parallelepipedal frame in which the cutter assembly 1 is fitted horizontally, and 3 a drive mechanism installed in the frame 2 for rotating the cutter assembly 1. A combination of the cutter assembly 1, frame 2 and drive mechanism 3 is referred to as body 10 in the following description and claims. Numeral 4 indicates a suspending fixture for suspending the mower body 10, 5 is a suspending rod engaged with the suspending fixture 4, and 7 is the adjusting chains. A reversing fixture 8 comprises an upper plate 81 and a lower plate 82, the latter being arranged turnable relative to the former about a pivotal bolt 84, with the rod supporting fixtures 6 being secured to the underside of the lower plate 82 for supporting the suspending rod 5 at its both ends. Joining fixtures 9 are provided on the upper plate 81 of the reversing fixture 8. A combination of the suspending fixture 4, suspending rod 5, rod supporting fixtures 6, adjusting chains 7, reversing fixture 8 and joining fixtures 9 is referred to hereafter as the suspending mechanism 40.

This dragged type mower, in use, has its body 10 joined to and suspended from an end of a boom B of a civil engineering machine such as a backhoe by the suspending mechanism 40 and is moved in the direction of arrow a to perform mowing. In the following description, regarding the mower body 10, the left side as seen in FIG. 1 is referred to as the front side and the right side as seen in FIG. 1 is referred to as the rear side in view of the moving direction. The rotating direction of the cutter assembly 1 is shown by arrow b.

As explained in detail later, the cutter assembly 1 comprises a plurality of rotatable hammer knife cutters joined to a cutter shaft which is rotated by the drive mechanism 3. The cutter assembly 1 is so designed that it will move slightly above the ground surface to cut the grass to the desired height. In this embodiment, the drive mechanism comprises a hydraulic motor 31, a belt 32 and pulleys 33, but an electric motor may be employed in place of the hydraulic motor. Also, reduction gearing, multiplying gearing and/or other suitable means may be incorporated in the drive mechanism. Either way, it is possible to drive the cutter assembly independently of the travel of the civil engineering machine by connecting the cutter assembly to a hydraulic or electric power source.

The frame 2 is of a structure which is minimized in openings for reasons of safety and prevention of dusting. It is merely open at its bottom, its front side in the direction of advance and a lower part of the rear side. At the rear side opening is provided a hard rubber grass discharge cover plate 23.

At the top end of the front side of the mower body 10, that is, at the front end of the top plate 21 of the frame 2 is secured a suspending fixture 4 which constitutes a lower end member of the suspending mechanism 40. Also, a guide roller 25 is provided at the rear end of the bottom portion of the frame 2. Further, at both side ends, extending from the front side to the bottom of the frame 2, there are provided arcuate round steel-made guide skids 24 which are concentric with and slightly greater in radius than the cutter assembly.

Thus, in operation, as the mower body 10 is pulled in the travelling direction of the civil engineering machine with the front upper end of the mower body 10 being joined to and suspended down from an end of the boom of the machine by the suspending mechanism 40, the mower is accordingly dragged with the guide roller 25 rotating, and thereby the grass on the ground is cut to a desired height by the cutter assembly 1 positioned slightly above the ground surface and rotated by the drive mechanism 3.

Figure 4A:
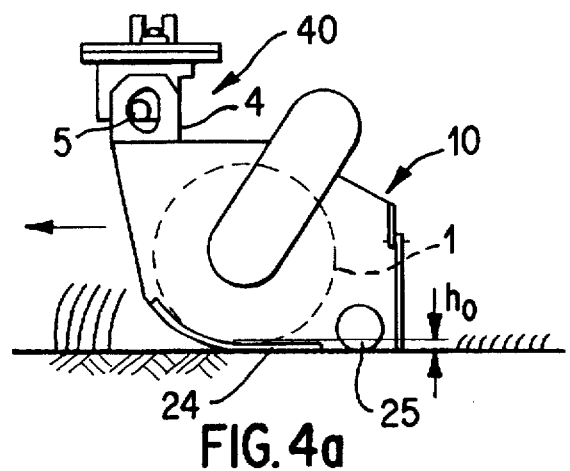
FIGS. 4(a) through 4(c) are side elevational views showing the movements of the suspending mechanism and the mower body in the first embodiment of the present invention.

The suspending fixture 4 in the suspending mechanism 40 comprises a pair of brackets 41 each having a hole 42 into which, the suspending rod 5 connected to the boom end extends. In this embodiment, the bracket hole 42 is arcuate or elliptical and so sized that when the suspending rod 5 has a diameter D, the width of the hole 42 in the lateral direction will be 1.5 D and its height 2.0 D. Therefore, even if the boom rises or drops slightly with the mower body 10 resting on the ground, the body 10 will remain resting on the ground if the rise or fall of the boom is within the limits of the vertical length of the hole 42, and thus the mower body 10 is allowed to move in accordance with the forward movement of the boom with the guide skids 24 and guide roller 25 being engaged with the ground as shown in FIG. 4(a).

Figure 4B:
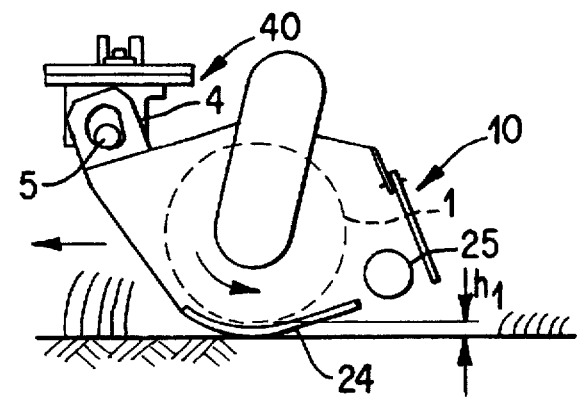

When the boom descends significantly, the suspending fixture 4 is depressed, causing the rear portion of the body 10 to rise up with the guide skids 24 serving as a fulcrum, and accordingly the guide roller 25 moves away from the ground surface as shown in FIG. 4(b). However, since the arc of the guide skid 24 is concentric with the cutter assembly 1, the distance between thus ground surface and the cutter assembly 1 remains unchanged, therefore the mown grass height $h_1$ when mowing in this situation is equal to that $(h_0)$ in the situation where the mower body 10 is positioned horizontally.

Figure 4C:
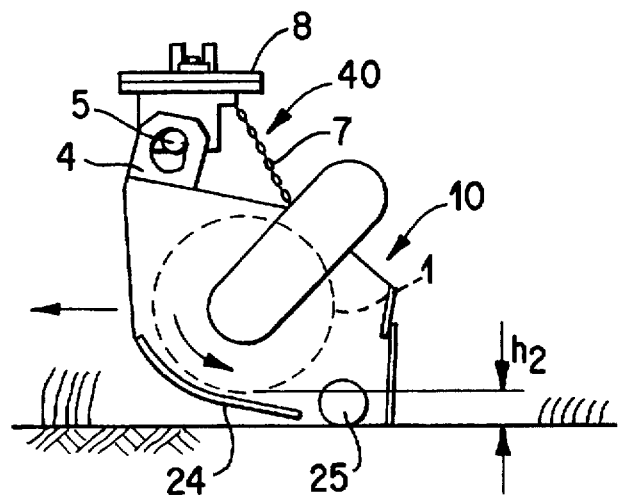

On the other hand, when the boom rises up beyond the limits of the hole 42, the front end of the body 10 is raised up, causing the guide skids 24 to be suspended above the ground surface, with the guide roller 25 left resting on the ground as shown in FIG. 4(c). The cutter assembly 1 is also raised up correspondingly. In this case, the mown grass height $h_2$ becomes greater than $h_0$, but the difference is small considering the rise of the boom.

Thus, although the suspending fixture 4 is pin joined to the suspending rod 5, the joints are loose in the vertical direction, so that the vertical movement of the boom does not directly lead to a corresponding variation in mown grass height, and almost uniform grass cutting can be accomplished regardless of the boom movement within given limits.

If the boom is further raised up from the situation of FIG. 4(c), the mower body 10 is caused to additionally slant and hang down, but the angle of suspension can be controlled by joining the reversing fixture 8 and the frame 2 by adjusting chains 7 of an appropriate length.

Figure 5A:
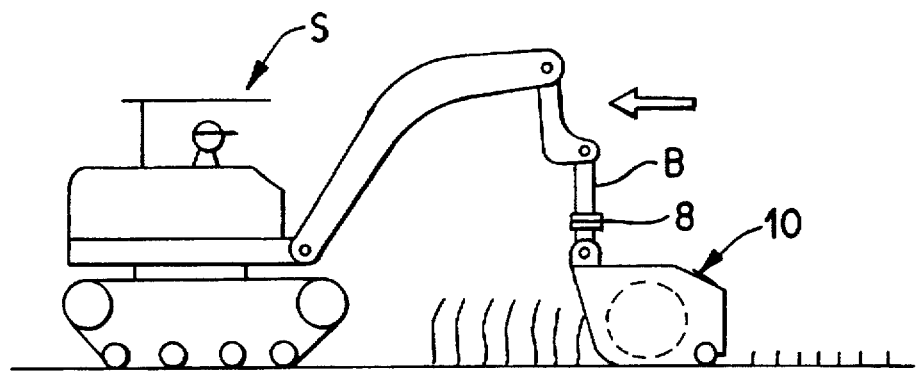
FIG. 5 is a side view showing the modes of use of the first embodiment of the present invention.
Figure 5B:
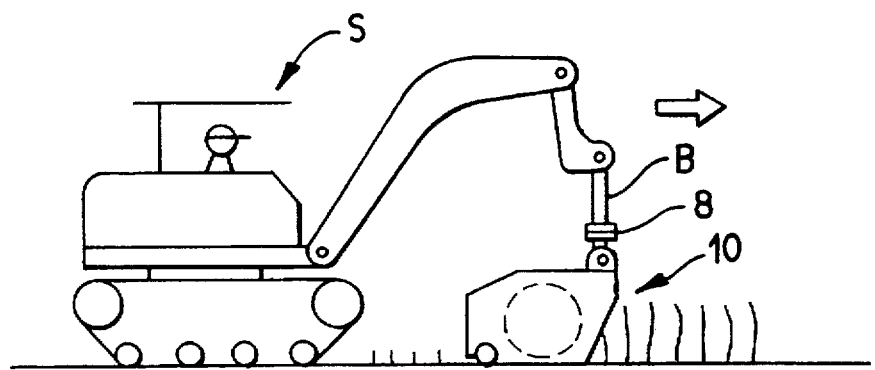

The direction in which the mower body 10 is allowed to advance is fixed, so that when the direction of movement of the civil engineering machine is changed from a forward direction to a rearward direction, or vice versa, it is necessary to turn the mower body 180° as shown in FIGS. 5 (a) and (b). This reversal of the mower body 10 can be easily effected by raising up the boom B to bring the body 10 into a suspended state and releasing the fixing pins 83 of the reversing fixture 8 to let the lower plate 82 of the fixture turn relative to the upper plate 81 about the pivot bolt 84.

Figure 6:
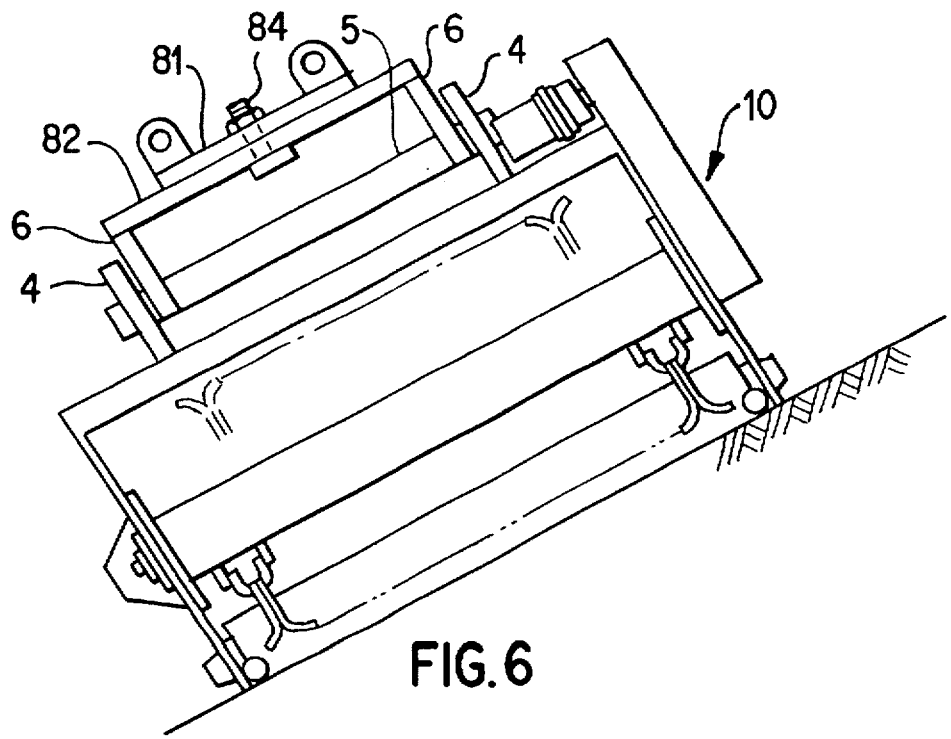
FIG. 6 is a front view showing a mode of use of the first embodiment of the present invention on a slope.

To the lower plate 82 of the reversing fixture 8 are secured a pair of rod supporting fixtures 6 with a certain spacing from each other, and a suspending rod 5 is fitted in the fixtures 6 with both ends of the rod projecting out from the fixtures. The pair of brackets of the suspending fixture 4 are engaged with the portions of the rod projecting out from the fixtures 6. By arranging the suspending fixture 4 as close to the rod supporting fixtures 6 as possible, it is possible to prevent the mower body 10 from sliding sidewise due to its own weight even when the mower is used on a slope as shown in FIG. 6.

Figure 7:
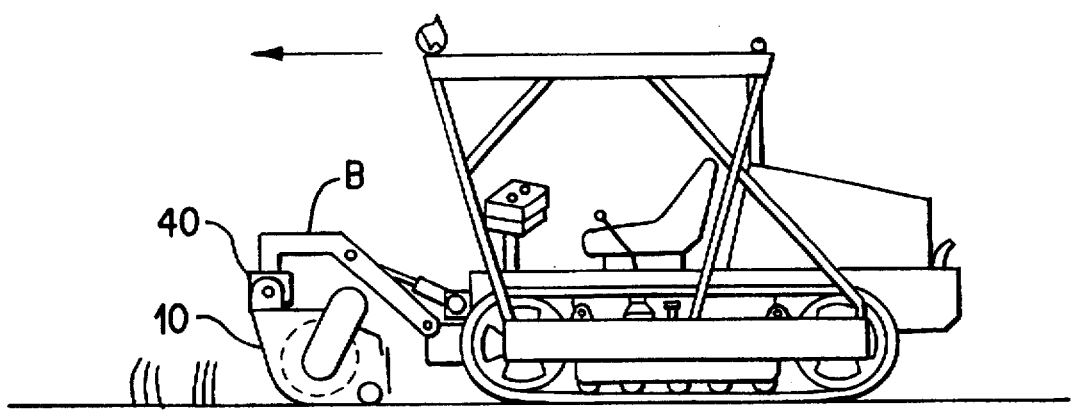
FIG. 7 is a side view showing a mode of use of the first embodiment of the present invention.

FIG. 7 illustrates the case where the dragged type mower of this invention was joined to a boom attached to a front end of a crawler tractor. The operator has only to operate the tractor with no need of caring about the cut grass height, so that he can perform the work safely without feeling much fatigue.

Figure 8:
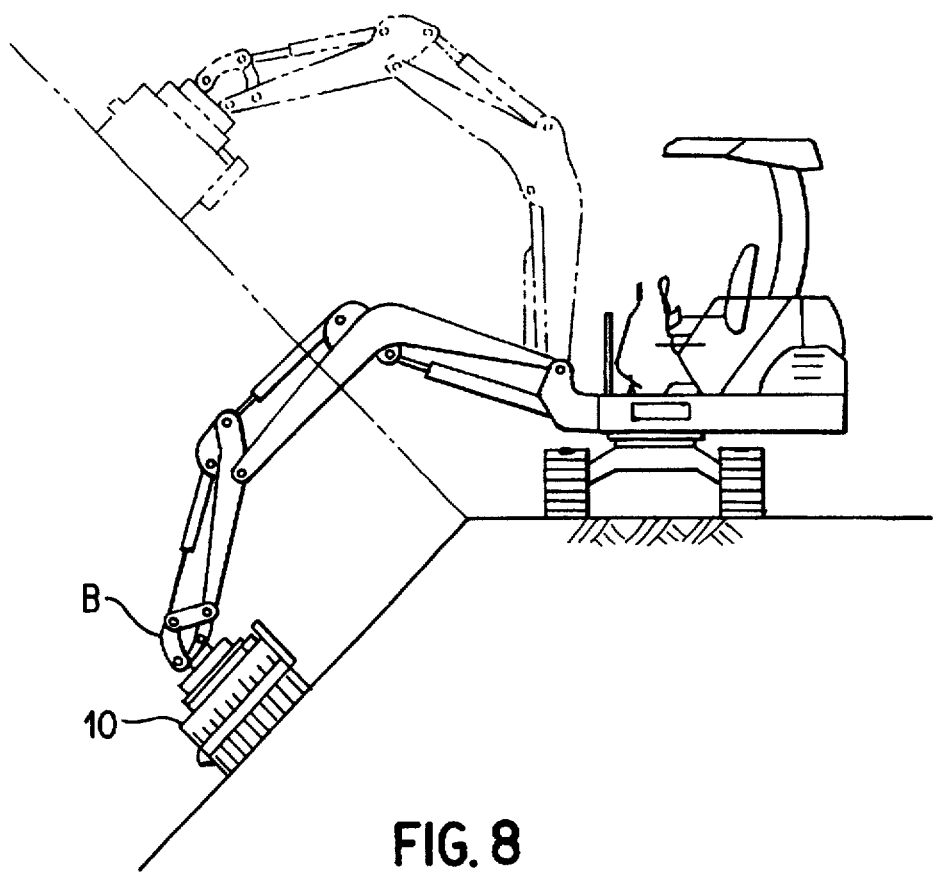
FIG. 8 is a side view showing a mode of use of the first embodiment of the present invention on a slope.

FIG. 8 is an illustration showing the dragged type mower of the present invention adapted to a backhoe and used for mowing on a steep slope. In this case, too, as explained with reference to FIG. 6, it is possible to perform mowing even on a steep grade with high efficiency and safety.

Figure 9:
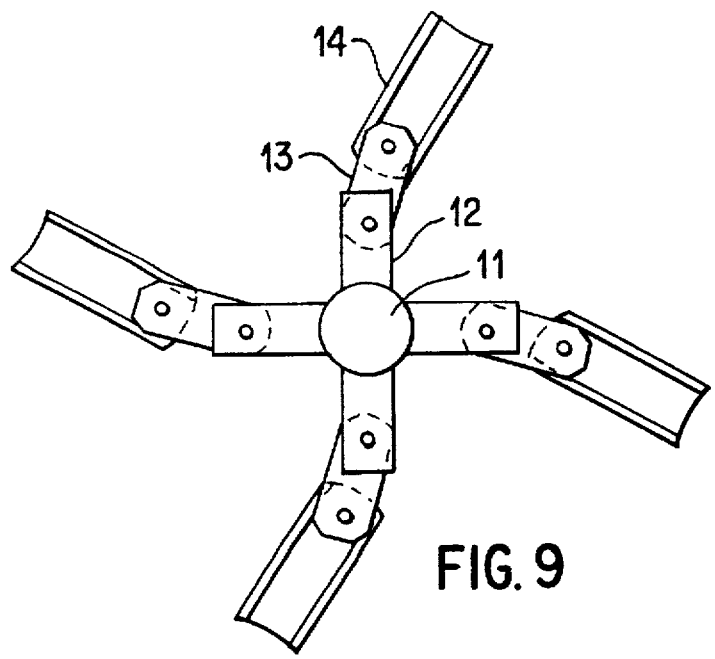
FIG. 9 is a side elevation of the cutter assembly according is to the present invention.
Figure 10:
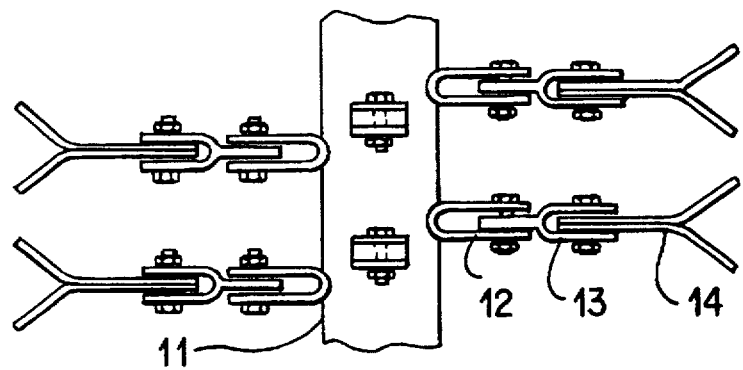
FIG. 10 is a front view thereof.

FIG. 9 is a side elevation of the cutter assembly 1 as viewed in the axial direction, and FIG. 10 is a partial frontal view thereof. In these drawings, reference numeral 11 designates a cutter shaft from which a plurality of arms 12 extend radially along the length of the shaft. 13 indicates intermediate links each of which is pivotally joined at one end to the free end of the corresponding arm by a pin, and a hammer knife cutter 14 is pivotally joined to the other end of the intermediate link 13. Thus, a plurality of arms 12 each having a hammer knife cutter 14 at its end are provided at predetermined intervals on the cutter shaft 11 along the full length thereof, so that as the cutter shaft 11 rotates, the distal hammer knife cutters 14 are forced to turn accordingly to cut the grass by their side edges.

Figure 14:
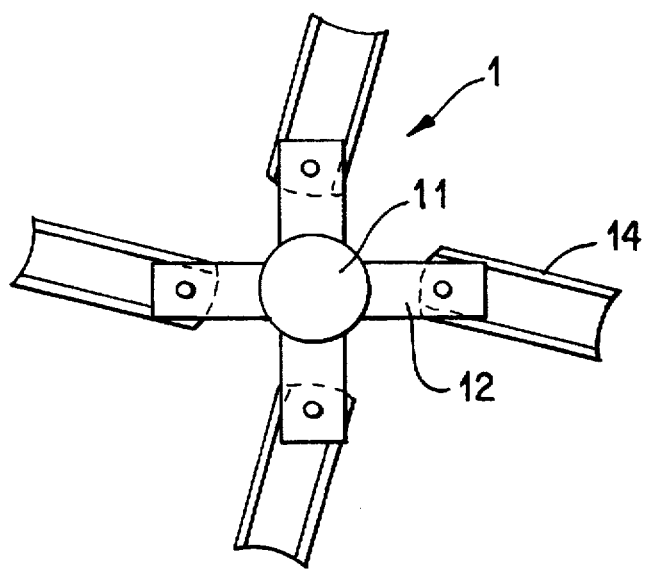
FIG. 14 is a side elevation of a conventional cutter assembly.
Figure 15:
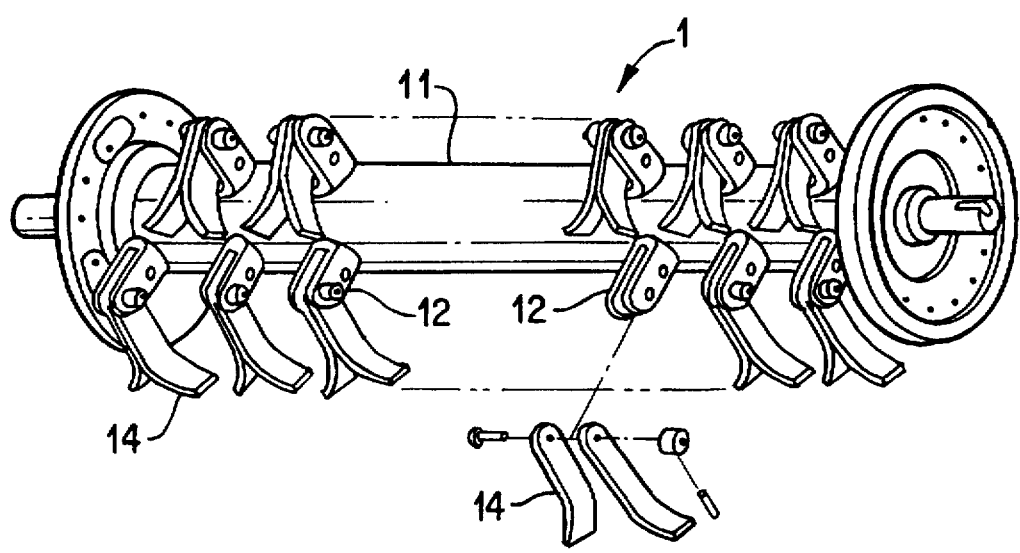
FIG. 15 is a perspective view thereof.

Although a conventional cutter assembly as shown in FIGS. 14 and 15 may be used, it is advisable to use a two-stage hinge type as shown in FIGS. 9 and 10. The latter construction has advantages in that even if the cutter assembly 1 should hit a foreign substance such as rocks in the grass, the cutter shaft 11 will not stop rotating. In addition, the normal rotation is quickly restored due to the fact that the intermediate links 13 and the cutters 14 joined thereto properly flex to pass by the foreign substance.

Second Embodiment

Figure 11:
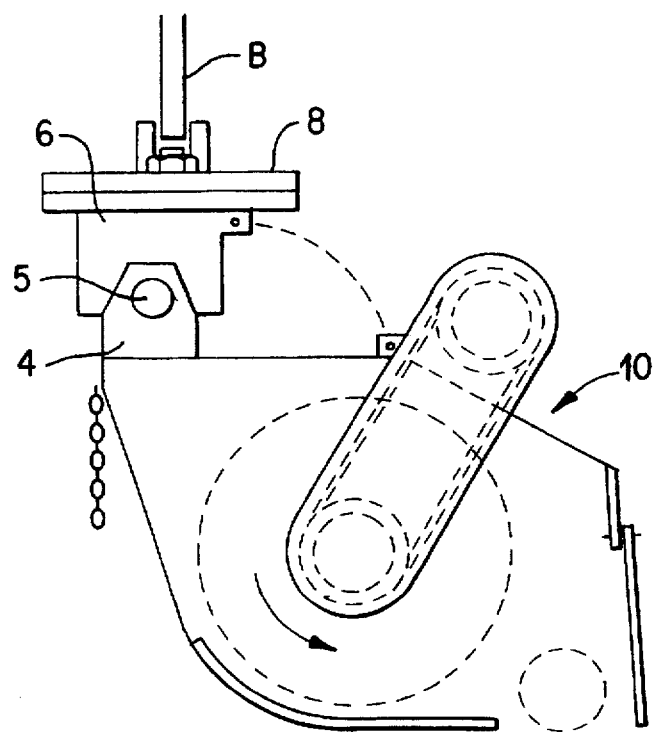
FIG. 11 is a side elevation showing a second embodiment of the present invention.

A second embodiment of the present invention is explained with reference to FIG. 11. In the first embodiment described above, the hole 42 in each bracket 41 of the suspending fixture 4 is so formed as to provide a clearance in both vertical and lateral directions, but in this embodiment the hole 42 is rounded to form essentially no clearance other than manufacturing tolerance to provide an ordinary pin joint. Therefore, the mower body 10 is rarely brought into the state shown in FIG. 4(a), and it is, in most cases, in the state of FIG. 4(b) or 4(c), but there is no change in its capability of cutting the grass to a substantially uniform height from the ground.

Third Embodiment

Figure 12:
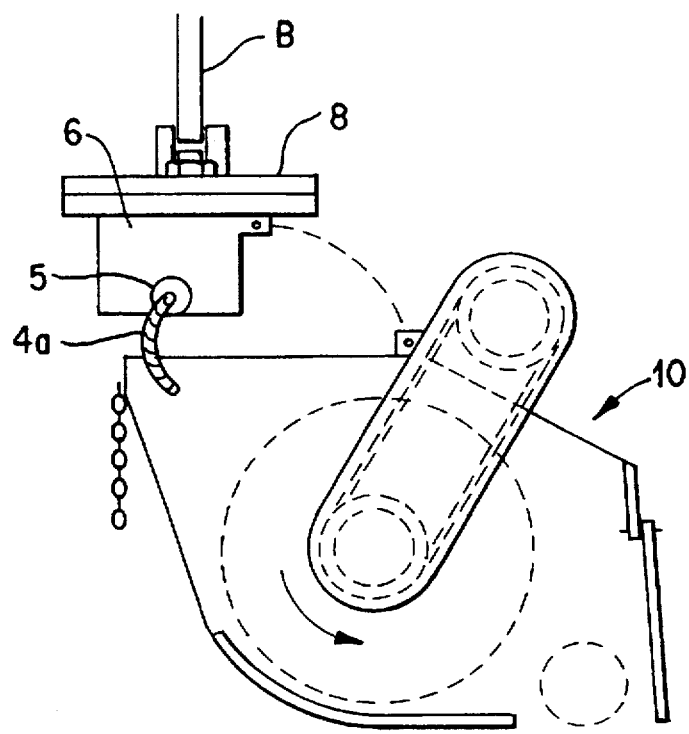
FIG. 12 is a side elevation showing a third embodiment of the present invention.
Figure 13:
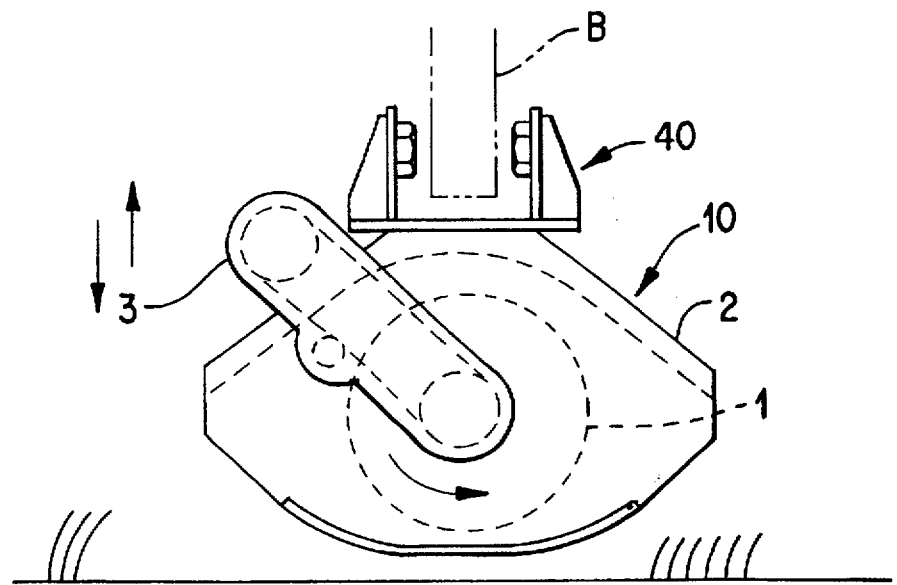
FIG. 13 is a side elevation of a prior art mower of the type discussed.

A third embodiment of the present invention is illustrated in FIG. 12. In the first embodiment, there is employed a loose hole design in the suspending fixture 4 as described above, but in this embodiment, cord-like means such as wire ropes 4a are used instead of the brackets to lift and support the mower body 10 while allowing a relative displacement between the suspending rod 6 and the body 10 in both vertical and back-and-forth directions by virtue of flexure of the wire ropes 4a. The cord-like means usable for this purpose include, besides the wire rope, chain, resin fabric and other cord-like articles which can bend freely.

Other mechanisms and modes of use are the same as in the first embodiment.

As described above, the dragged type mower according to the present invention is capable of performing the mowing operation efficiently and in a labor-saving manner, with the grass being cut substantially uniformly in leftover height from the ground.

It should be apparent from the foregoing detailed description that the objects set forth at the outset to the specification have been successfully achieved. Moreover, while there is shown and described present preferred embodiments of the invention, it is to be distinctly understood that the invention is not limited thereto but may be otherwise variously embodied and practiced within the scope of the following claims.

What is claimed is:

1. A mower adapted to be mounted on a travelling civil engineering machine having a boom extending therefrom, said mower comprising a mower body and a suspending mechanism, said suspending mechanism being attached to an end of said boom and joined to a front upper end of said mower body to suspend said mower from said boom in such a way as to compensate for variations in height of said boom from the ground to thereby maintain said mower body at an essentially constant predetermined height above ground, and as said joined boom end is moved, the mower body is accordingly dragged to perform mowing said suspending mechanism comprising a pin joint, said pin joint comprising a pair of brackets, each bracket having a pin hole, and a pin having a predetermined cross-section accommodated in said holes, wherein each of the pin holes is formed circularly or elliptically with axes larger than the pin cross-section to provide a loose Joint in both vertical and lateral directions, and thereby compensate for variations in height of said boom from the around to thereby maintain said mower body at an essentially constant predetermined height above ground, said body comprising arcuate guide skids disposed at each side thereof from its front to the bottom thereof, and a horizontal guide roller disposed at the rear bottom of the body, said roller being rotatable with movement of the mower body.

2. A mower according to claim 1, wherein the body comprises a substantially rectangular-parallelepipedal frame, a cutter assembly having a shaft mounted horizontally substantially centrally in said frame, and a drive mechanism for driving said cutter assembly, wherein said arcuate guide skids are disposed at both side end sections of said frame from its front side to the bottom end thereof, said arcuate guide skids being concentric with said cutter shaft and slightly greater in radius than said shaft.

3. A mower according to claim 2, wherein the cutter assembly has a plurality of hammer knife cutters extending radially from the cutter shaft along the length thereof, each of said hammer knife cutters being pivotally mounted on said shaft.

4. A mower according to claim 3, wherein the cutter assembly has a plurality of arms extending radially from the cutter shaft along the length thereof, each of said arms being pivotally joined at the free end to an end of an intermediate link which is further pivotally joined at the other end thereof to a hammer knife cutter.

5. A mower according to any one of claims 1 to 4, wherein pin joints are provided in the suspending mechanism to allow the mower body to swing about its horizontal axis.

6. A mower according to claim 5, wherein a reversing fixture is provided in the suspending mechanism to allow the mower body to turn 180° about the vertical axis.

7. A mower according to claim 1, wherein when said pin has a diameter D, said holes have a lateral width of 1.5 D and a height of 2.0 D.

8. A mower according to claim 1, wherein a reversing fixture is provided in the suspending mechanism to allow the mower body to turn 180° about the vertical axis.

9. A mower according to any one of claims 1 to 4, wherein said suspending mechanism comprises elongated flexible joints to allow the mower body to swing about its horizontal axis while forming loose joints in both vertical and lateral directions.

10. A mower according to claim 9, wherein a reversing fixture is provided in the suspending mechanism to allow the mower body to turn 180° about the vertical axis.

11. A mower according to any one of claims 1 to 4, wherein a reversing fixture is provided in the suspending mechanism to allow the mower body to turn 180° about the vertical axis.

12. A mower according to claim 3, wherein each of said hammer knife cutters is pivotally mounted on said shaft through a pin.

* * * * *